May 20, 1930.  E. S. RINALDY  1,759,630
CINEMA APPARATUS
Filed June 21, 1921  3 Sheets-Sheet 1

Inventor
Edward S. Rinaldy
By his Attorney

May 20, 1930.  E. S. RINALDY  1,759,630
CINEMA APPARATUS
Filed June 21, 1921  3 Sheets-Sheet 2
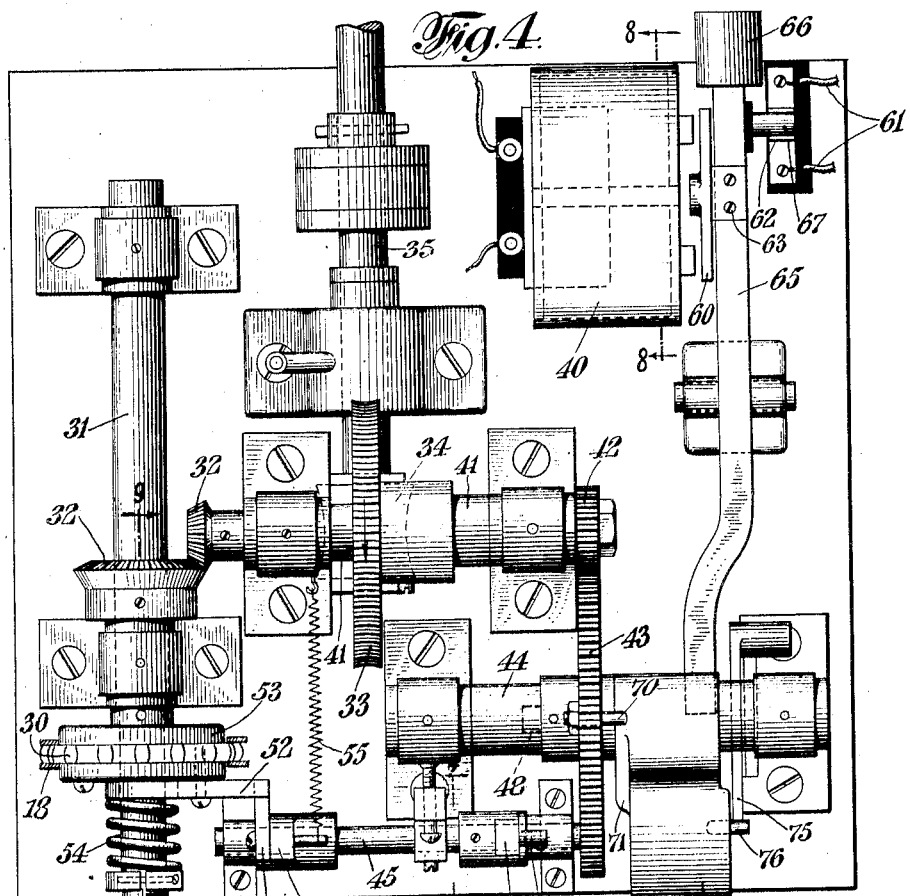
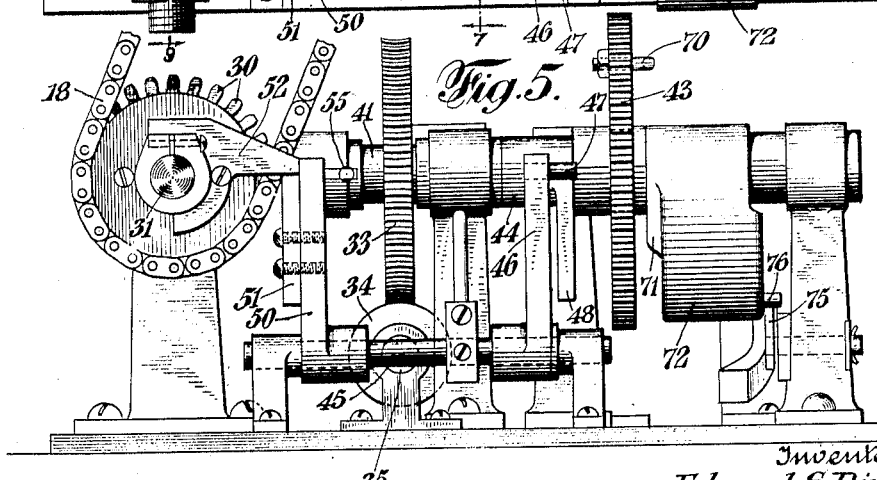
Inventor
Edward S. Rinaldy
By his Attorney May 20, 1930. E. S. RINALDY 1,759,630
CINEMA APPARATUS
Filed June 21, 1921 3 Sheets-Sheet 3
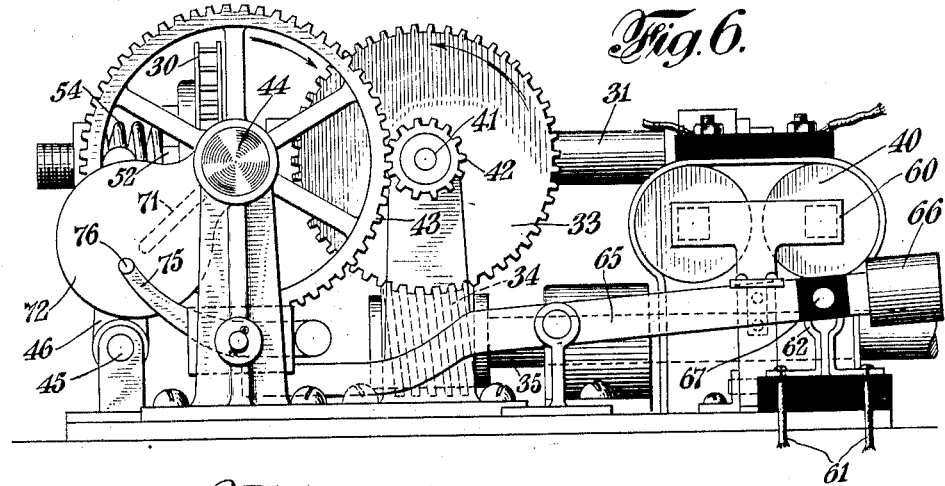
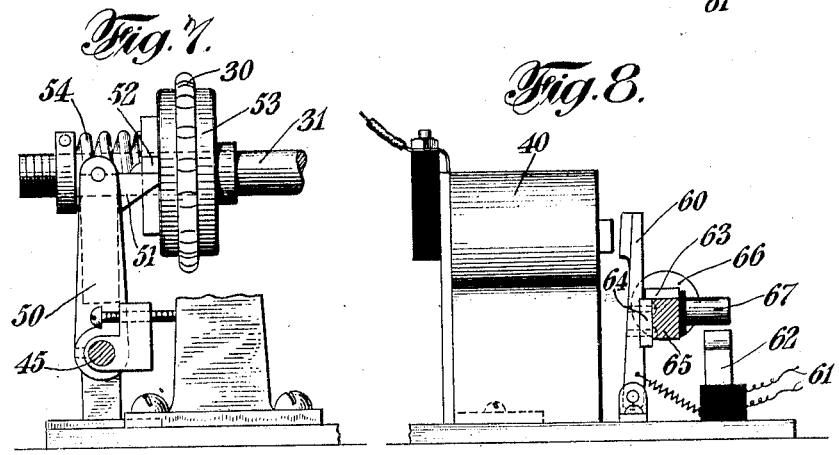
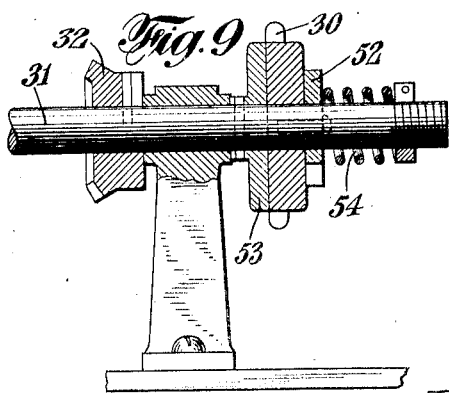
Inventor
Edward S. Rinaldy
By his Attorney Patented May 20, 1930

1,759,630

UNITED STATES PATENT OFFICE

EDWARD S. RINALDY, OF ROCKVILLE CENTER, NEW YORK

CINEMA APPARATUS

Application filed June 21, 1921. Serial No. 479,216.

The invention relates to improvements in motion picture taking apparatus, more particularly to a camera apparatus designed to be intermittently operated, for example, as employed in the photography of growing objects, as in the photography of plant life and the development of bacteria and lower forms of life.

It has for its object, in apparatus of this character, to provide an electrically controlled actuating mechanism for the camera portion, which mechanism may simultaneously with the operation of the camera also serve to control the source of illumination for effecting the photograph. A further object of the invention consists in improved means for effecting, periodically, the closure of an electric circuit for controlling the operation of the mechanism aforesaid, and, also, to means for restoring conditions to normal.

The nature of the invention, however, will best be understood when described in connection with the accompanying drawings, in which—

Fig. 4 is a plan of the camera controlling apparatus.

Fig. 5 is an end view, and Fig. 6 is a side view of said apparatus.

Figs. 7, 8 and 9 are sectional views taken respectively on the lines 7—7, 8—8 and 9—9, Fig. 4.

Similar characters of reference designate corresponding parts thruout the several views.

Figure 1:
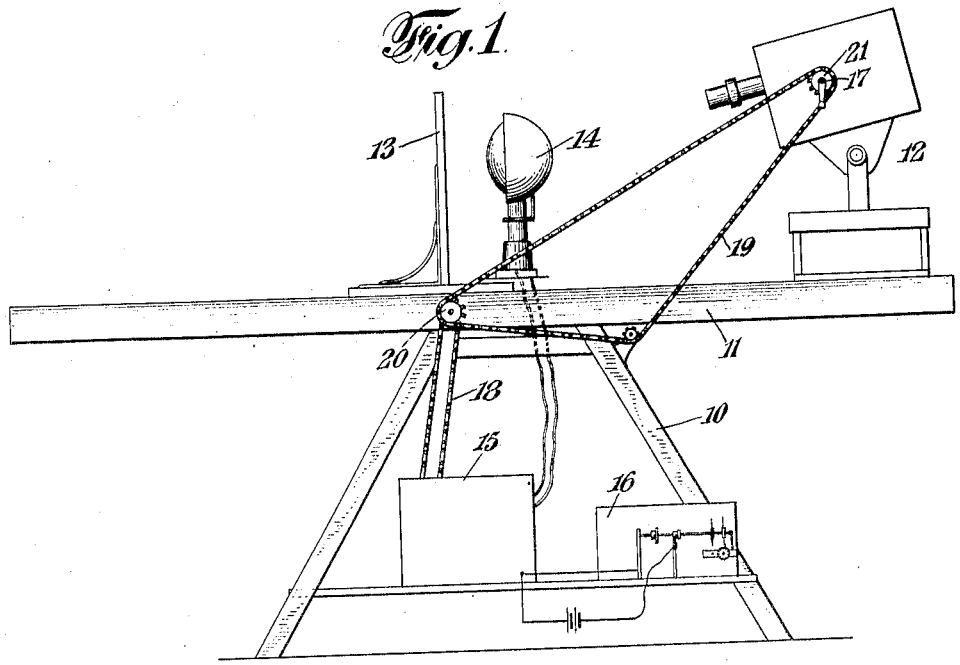
Fig. 1 is a more or less diagrammatic view illustrating the general arrangement of the apparatus.

Referring to Fig. 1 of the drawings, 10 designate a suitable stand or support for a tiltable table or platform 11 upon which is mounted at one end the usual camera 12. The platform 11 carries also a sliding or adjustable support 13 in which the object to be photographed may be mounted; and at the same time carries a source of illumination such as the electric lamp 14 which is disposed in proximity to the frame to afford proper illumination of the subject to be photographed. The stand 10 may carry, also, a cabinet 15 containing the actuating mechanism for the camera and a cabinet 16 of the circuit controlling apparatus for controlling the actuation of the mechanism in the cabinet 15. Rotation of the drive shaft 17 of the camera is to be effected from the mechanism within the container 15; and the same may be transmitted thereto thru chains 18 and 19 driving suitable sprockets 20 and 21, respectively, the former sprocket being mounted on the table 11 and the latter on the shaft 17, all of which is well understood and forms no particular part of the present invention.

The invention relates more especially to the mechanism for imparting motion to the chains 18—19; and the same is more clearly set forth in Figs. 4 to 9. Reference being had to these figures, it will be noted that the chain 18 fits about a sprocket 30 which is normally loosely mounted on a shaft 31, but is designed to be clutched thereto in manner hereinafter set forth. Shaft 31, in turn, is arranged to be rotated, thru bevel gear wheels 32 and a worm wheel 33 and a worm 34, from a motor shaft 35, which latter is to be actuated by an electric motor (not shown).

Current for actuating the motor may be supplied from any suitable source (not shown); and is controlled by a relay device 40 in manner hereinafter set forth. As soon as the relay acts to close the circuit to the motor, shaft 35 will be rotated, the circuit to the lamp 14 simultaneously closed herewith, and the shaft 31 set in rotation.

Moreover, a shaft 41, carrying the worm wheel 33, carries also a pinion 42 meshing with a gear wheel 43 on a shaft 44. Arranged parallel to the shaft 44, but below same, is a rock shaft 45 carrying at one end an arm 46. This arm is provided with a laterally extending pin 47 which is adapted to be wiped by an arm 48 carried by the shaft 44 as the latter rotates, and will thus impart to the shaft 45 a rocking motion.

At the other end of the rock shaft 45 is secured a further arm 50 having a plate 51 secured thereto which is adapted to engage a detent 52 attached to, and rotatable with, the sprocket 30. As the shaft 45 is rocked, detent 52 will be released from the plate 51, permitting thereby the sprocket wheel to rotate, the latter being then frictionally held to and carried around by a hub 53 secured to the shaft 31 and to which hub it is forced thru the action of a coil spring 54 mounted about said shaft 31. The arrangement is such, moreover, that the rock shaft will have been returned, under the action of a spring 55, to its normal position prior to the completion of one revolution of the sprocket wheel and detent 52 carried thereby, so that the plate 51 will be in position to stop the rotation of said sprocket wheel at the end of a complete revolution thereof. The gearing is so adjusted that this will effect the proper rotation of the drive shaft 17 of the camera for affording the desired exposure or number of exposures.

It will be appreciated, however, that the rotation of shaft 35 must also be caused to cease thru the cutting off of power to its driving motor (not shown). To this end, after the relay 40 has been energized, in manner hereinafter set forth, and its armature 60 caused to close the power circuit 61 thru a knife blade switch or the like 62, means are provided to open the circuit at said switch and to restore conditions to normal. For this purpose, the pivoted armature 60 is arranged to engage under a locking bar 63, Fig. 8, thru a projection or latch 64 attached to said armature, the bar 63 being carried by a lever 65 provided with a counter weight 66. Lever 65 carries also the blade 67 for closing the circuit at switch 62. It will be understood that when armature 60 is attracted thru the energization of the relay magnets, latch 64 will be withdrawn from under the bar 63, permitting the lever 65 to descend and to close the circuit at switch 62 for effecting the rotation of shaft 35.

At the same time, rotation of shaft 35 will effect rotation of the gear wheel 43 which carries a laterally extending pin 70 designed to engage a rib 71 on a weight 72 loosely mounted upon the shaft 44. As wheel 43 rotates, pin 70 will pick up and carry with it the weight 72 until the same reaches its highest point, whereupon it will fall under its own momentum ahead of the gear, drop upon the end of the lever and break the contact at switch 62. This restores the conditions to normal, the energizing current for the relay having in the meantime been cut off. In order to prevent the weight 72 from rebounding beyond a predetermined point, a counterweighted arm 75 is pivoted on shaft 44 and is adapted to be engaged by a laterally extending pin 76 of the weight 72, the pin wiping past the arm in the one direction, that is to say in the direction of rotation of the wheel 43, but being prevented from returning in the opposite direction thru locking of said arm against movement in the reverse direction. When the relay 40 is again energized, the operations hereinbefore described will be repeated.

Figure 2:
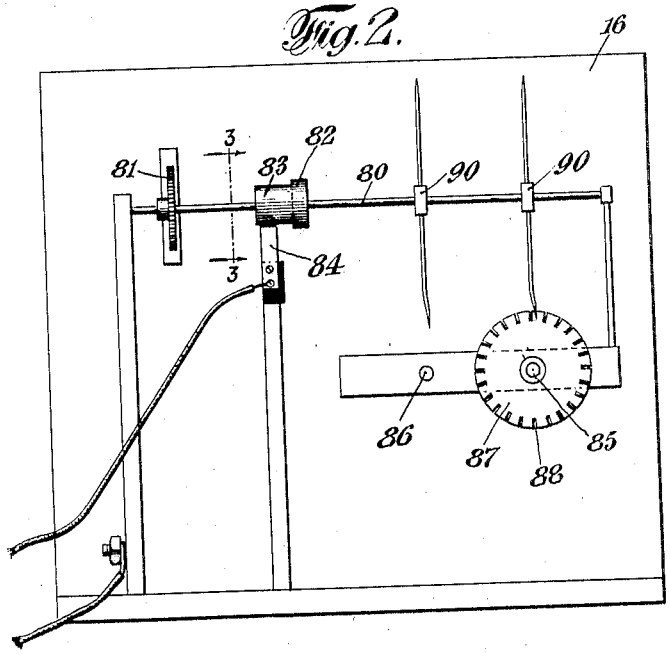
Fig. 2 is an elevation of the improved circuit closing mechanism.
Figure 3:
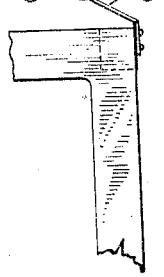
Fig. 3 is a fragmentary section taken on the line 3—3, Fig. 2, looking in the direction of the arrows.

To effect periodically the energization of the relay 40, various circuit closing devices may be employed; but I have found the device set forth more particularly in Figs. 2 and 3 of the drawings to be especially suitable for this purpose. As shown, the mechanism consists essentially of a rotatable shaft 80 which may be driven by a suitable spring motor, indicated by the driving gear 81. Shaft 80 carries a drum 82 upon which is provided a cam portion 83 adapted to wipe a contact brush 84 once during each complete revolution of the shaft 80. Rotation of this shaft, however, is controlled thru a time actuated member which may consist of an arbor 85 suitable for small intervals of time as well as an arbor 86 adapted for longer intervals of time, both being controlled in well-known manner from suitable clock mechanism (not shown). On these arbors may be provided disk members 87 having circumferential slots 88, the disposition of same on the disks determining the intervals of circuit closing. To engage with these slots, there is provided an arm member or arm members 90 secured to the shaft 80 and their ends being adapted to pass thru the slots when in proper relationship thereto, an end of an arm at other times bearing upon the side or face of the disk and thereby preventing rotation of shaft 80. As soon as an end enters the slot and passes therethru, the arm will rotate and with it the shaft 80; but the arrangement is such that a half revolution only of the shaft will be permitted. For this purpose, the one end of the arm is off-set or displaced from the plane of the other, as otherwise the slowly rotating disk would not have advanced the slot sufficiently to avoid further passing of the arm therethru and would thus not prevent a number of revolutions of the arm from occurring. When the disk has advanced sufficiently, the other end of the arm will pass thru the corresponding slot and the complete revolution of the shaft will have been made, at the same time effecting a momentary closure of the circuit to the relay thru the wiping of brush 84 by the cam 83. This sets into operation the various mechanisms, as hereinbefore set forth. Moreover, it will be appreciated that should conditions require a sudden change in the time interval, a different disk may be substituted on one or the other of the two arbors, as circumstances may require, since the time necessary for such change will, as a rule, be less than the smallest time interval of exposure.

I claim:

1. In combination with an intermittently operated motion picture camera; mechanism for intermittently actuating the camera mechanism, and comprising an operating shaft and means to impart unidirectional rotation thereto, a member loosely mounted thereon and connected with said camera for operating the camera mechanism, means movable with said loosely mounted member to hold the same against rotation, means to clutch said loosely mounted member to the shaft, and controlling means therefor including an intermittently actuated shaft and releasing means thereon for the holding means of the said loosely mounted member, and automatically-operated means to terminate the rotation of said operating shaft after a predetermined movement of said controlling means.

2. In combination with an intermittently operated motion picture camera; of mechanism for intermittently actuating the camera mechanism, and comprising a shaft, means to impart unidirectional rotation thereto, a rock shaft adapted to be rocked intermittently from said rotation imparting means, a member loosely mounted on the continuously rotating shaft and connected with said camera for operating the camera mechanism, means movable with said loosely mounted member to hold the same against rotation, a stop member movable with said rock shaft and adapted to engage the holding means of said loosely mounted member, means to clutch said loosely mounted member to the shaft upon release of its said holding means, means to restore the stop member to reengaging position prior to a complete rotation of said holding means to arrest its movement after one complete rotation thereof, and automatically operated means to terminate the rotation of said rotation imparting means upon completion of one rotation of the holding means.

3. The combination with an intermittently operated motion picture camera; of mechanism for intermittently actuating the camera mechanism, and comprising a unidirectional rotating shaft, a member loosely mounted thereon and connected with said camera for operating the camera mechanism, means movable with said loosely mounted member to hold the same against rotation, means to clutch said loosely mounted member to the shaft and controlling means therefor including an intermittently actuated shaft and releasing means thereon for the holding means of the said loosely mounted member, and resetting means for the intermittently actuated shaft, and means, including a gravity actuated member, for terminating the rotation of the continuously rotating shaft.

4. The combination with an intermittently operated motion picture camera; of mechanism for intermittently actuating the camera mechanism, and comprising a unidirectional rotating shaft, a member loosely mounted thereon and connected with said camera for operating the camera mechanism, a detent movable with said loosely mounted member, resilient means to frictionally secure said loosely mounted member to its shaft, a spring-drawn rock shaft and means to rock the same, said rock shaft carrying means to engage the said detent when the rock shaft is stationary and to release the same when the rock shaft is moved, and means, including a gravity actuated member, for terminating the rotation of the continuously rotating shaft.

Signed at New York in the county of New York and State of New York this 17th day of June, A. D. 1921.

EDWARD S. RINALDY.